(12) United States Patent
Fitler, Jr. et al.

(10) Patent No.: US 6,366,913 B1
(45) Date of Patent: Apr. 2, 2002

(54) CENTRALIZED DIRECTORY SERVICES SUPPORTING DYNAMIC GROUP MEMBERSHIP

(75) Inventors: William H. Fitler, Jr., Palo Alto; Timothy A. Howes, Sunnyvale; Bruce L. Steinback, Mountain View, all of CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/177,434

(22) Filed: Oct. 21, 1998

(51) Int. Cl.[7] .............................................. G06F 17/30
(52) U.S. Cl. ................. 707/9; 707/10; 707/3; 707/6; 707/104; 709/201; 709/242; 709/244
(58) Field of Search .............................. 707/3, 10, 6, 9, 707/203; 709/225, 226, 201, 229, 206, 212, 242, 244; 379/10; 713/167; 705/42, 54

(56) References Cited

U.S. PATENT DOCUMENTS

| | | | | |
|---|---|---|---|---|
| 4,925,311 A | * | 5/1990 | Neches et al. | |
| 5,677,851 A | * | 10/1997 | Kingdon et al. | 364/514 |
| 5,687,167 A | * | 11/1997 | Bertin et al. | 370/254 |
| 5,694,393 A | * | 12/1997 | Kaye | 370/408 |
| 5,748,736 A | * | 5/1998 | Mittra | 380/21 |
| 5,787,442 A | * | 7/1998 | Hacherl et al. | 707/201 |
| 5,991,393 A | * | 11/1999 | Kamen | 379/265 |
| 5,991,807 A | * | 11/1999 | Schmidt et al. | 709/225 |
| 6,018,766 A | * | 1/2000 | Samuel et al. | 709/218 |
| 6,049,799 A | * | 4/2000 | Mangat et al. | 707/10 |
| 6,061,499 A | * | 5/2000 | Hlebovy | 392/485 |
| 6,065,054 A | * | 5/2000 | Dutcher et al. | 709/226 |
| 6,092,199 A | * | 7/2000 | Dutcher et al. | 713/201 |
| 6,105,027 A | * | 8/2000 | Schneider et al. | 707/9 |
| 6,192,362 B1 | * | 2/2001 | Schneck et al. | 707/10 |

OTHER PUBLICATIONS

Dinsmore et al. "Policy based security management for large dynamic groups" pp. 64–73.*
Caronni et al., "Efficient security for large and dynamic multicast groups" pp. 376–383.*
Shaw–Cheng Chuang, "A flexible and secure multicast architecture for ATM networks" pp. 701–707.*

* cited by examiner

*Primary Examiner*—Jean M. Corrielus
(74) *Attorney, Agent, or Firm*—Michael A. Glenn (57) ABSTRACT

A method whereby application and network services (such as access control and electronic mailing list servers) can use a directory service to define groups of directory members using a directory search specification evaluated at service delivery time (dynamic group membership.) Traditionally, network services have been delivered to groups of users defined in relatively narrow manners: either by keeping a list of all users who are members of the group, or by attaching specific group membership attribute information to the information maintained about each specific user. Dynamic group membership allows these services to be delivered to groups of users who can be defined by a completely arbitrary specification of user attribute information. For example, electronic mail can be sent to a group of users whose office was located in a certain building (specifically, whose office location attribute matched a specific value.) Another example is that users may be permitted to access a network service, such as a printer, based on whether the printer is in the same building as the user (specifically, whether the printer's location attribute matches the user's office location attribute).

25 Claims, 4 Drawing Sheets

| name | location | department | manager |
|------|----------|------------|---------|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |
|  |  |  |  |

FIG. 1
*(Prior Art)*

| Engineering Group (static) |
|---|
| Jane Hoch |
| Bill Waddell |
| Amit Nukula |
|  |

| Marketing Group (static) |
|---|
| John Smith |
| Albert Wall |

FIG. 2
*(Prior Art)*

| Engineering Group (dynamic: department=Engineering) | | | |
|---|---|---|---|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |
| | | | |

| Marketing Group (dynamic: department=Marketing) | | | |
|---|---|---|---|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |

FIG. 3

| name | location | department | manager |
|---|---|---|---|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |
| Sam Spinoza | Bldg 12 | Engineering | Seif Steiner |
| Judy Wong | Bldg 11 | Engineering | Judy Tomlin |
| Tim Harkins | Bldg 12 | Marketing | Will Robinson |

FIG. 4
*(Prior Art)*

| Engineering Group (dynamic: department=Engineering) | | |
|---|---|---|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |
| Sam Spinoza | Bldg 12 | Engineering | Seif Steiner |
| Judy Wong | Bldg 11 | Engineering | Judy Tomlin |
| Tim Harkins | Bldg 12 | Marketing | Will Robinson |

| Marketing Group (dynamic: department=Marketing) | | |
|---|---|---|
| John Smith | Bldg 12 | Marketing | Will Robinson |
| Jane Hoch | Bldg 12 | Engineering | Seif Steiner |
| Bill Waddell | Bldg 11 | Engineering | Judy Tomlin |
| Amit Nukula | Bldg 12 | Engineering | Seif Steiner |
| Albert Wall | Bldg 11 | Marketing | Will Robinson |
| Sam Spinoza | Bldg 12 | Engineering | Seif Steiner |
| Judy Wong | Bldg 11 | Engineering | Judy Tomlin |
| Tim Harkins | Bldg 12 | Marketing | Will Robinson |

*FIG. 6*

| Engineering Group (static) |
|---|
| Jane Hoch |
| Bill Waddell |
| Amit Nukula |
| Sam Spinoza |
| Judy Wong |

| Marketing Group (static) |
|---|
| John Smith |
| Albert Wall |
| Tim Harkins |

CENTRALIZED DIRECTORY SERVICES SUPPORTING DYNAMIC GROUP MEMBERSHIP

BACKGROUND OF THE INVENTION

1. Technical Field

The invention relates to a method of improving administration and management of services provided in a network. More specifically, the invention relates to defining groups of users who access network services, or are provided network services, in such a way as to determine membership only when the service is requested or about to be provided, and to determine this membership based on a flexible specification of user or object attributes.

2. Description of the Prior Art

Traditional methods of identifying groups of users who are to receive network services can be classified as follows:

A group may be comprised of a list of members belonging to the group.

A user may be identified as a member of a group by having a specific attribute with a specific value identifying the user as a member of the group.

Static Lists

The Unix file system supports a groups permission model to specify who may access various files (and directories.) Each file is owned by a specific user and group. To determine whether a user can access a file, the user must be identified as its owner or must be in the list of users who belong to the group which owns the file.

Electronic mailing lists are maintained to allow electronic mail to be distributed to all users who are listed as members of the list. Systems such as majordomo implement mechanisms to maintain membership in the list on a user-by-user basis.

Calendaring software, such as Corporate Time from Corporate Software & Technologies Int. Inc., supports specific groups of users who may modify the schedule to a room or network resource, or who may be invited to a particular meeting.

While all of the above groups may contain other groups, they all require specific maintenance of membership information about the group. Specifically, whomever is a member of the group to receive access or service must be explicitly listed in the group itself, or as a member of a group which is listed as a member. Each time a user enters or exits an organization, the user must be specifically added to all appropriate groups, or specifically removed from such groups. As the number of different groups in an organization grows, this can be a major administrative burden.

While removal of user names from all groups can be automated, it is more difficult to automate entering users in all appropriate groups. Typically, information about who should and should not be entered in a group is distributed throughout an organization, and services for a new user can be made available relatively haphazardly, depending on when the administrative entity responsible for each group learns about a user and their need for service. In the case of mailing lists, an information service (for example) may never be made available to a user if the administrator fails to know that the user is entitled to the information (such as a contractor working in a building may not be entered in the mailing list for people who work in the building because the contractor is not administered by the same entity as everyone else in the building.)

Group Attributes

An alternative method of identifying group membership consists of adding specific group identification information to the collection of information about a user.

An example of physical group attribute identification involves issuing an employee identification badge or key. The user can be granted a service or admitted to a building upon presentation of the badge or by using the key to open a lock. In this case, control of a user's right to access requires providing or confiscating a physical token (the badge or key.)

Electronic badge sensor systems can now communicate to a centralized service to check whether the badge bearer can access a service or system. This access, however, is usually granted to a list of badges—which is identical to the group list method described above.

In digital certificate technology, groups can be identified as those people possessing certificates that have been signed by a specific certification authority (CA). For example, all company employees may be identified as those who possess certificates signed by the company CA. There is no need to consult a static list to determine membership in the company (the CA's signature is verified using algorithmic means.) While this is a very scaleable mechanism for identifying group membership it remains relatively rigid, i.e. the person is a member of the group or not.

It would be advantageous to provide a technique for defining groups of users who access network services, or are provided network services, in such a way as to determine membership only when the service is requested or about to be provided, and to determine this membership based on a flexible specification of user or object attributes.

SUMMARY OF THE INVENTION

The invention herein provides a technique, referred to as dynamic group membership, which is based on a more flexible model of specifying group membership. Specifically, a group member can be determined by whether the information maintained in a centralized directory service matches an arbitrary specification. Thus, instead of checking to see whether a user possesses a specific group attribute, dynamic group membership is determined by checking any user attribute.

DETAILED DESCRIPTION OF THE INVENTION

The invention herein provides a technique, referred to as dynamic group membership, which is based on a more flexible model of specifying group membership. Specifically, a group member can be determined by whether the information maintained in a centralized directory service matches an arbitrary specification. Thus, instead of checking to see whether a user possesses a specific group attribute, dynamic group membership is determined by checking any user attribute.

For example, assume that a user has these attributes:

name
location
department
manager

There are at least three kinds of groups that can be driven from this attribute information:

Department groups—everyone with the same department.
Examples: Marketing, Engineering, Sales, Accounting.
Direct reports—everyone with the same manager.
Examples: Will Robinson's Staff, Seif Steiner's Staff, Judy Tomlin's Staff.
Building groups—everyone who works in the same building.
Examples: Building 12 List, Building 11 List.

When using static group lists, each of these groups is maintained separately. Thus, if a person moves from building 12 to building 11, that person must be removed from the Building 12 list and added to the Building 11 list. This requires two separate and unrelated administrative actions. When using dynamic groups, however, information need only be changed in a single place (i.e. the user's location is changed in their directory entry). Thereafter, if mail is sent to the Building 12 list, the user no longer receives it and, conversely, if mail is sent to the Building 11 list, it is automatically delivered to the user because the value of the user's location attribute matches that of Building 11 and not Building 12.

One advantage of the invention is apparent when adding or deleting users to or from a centralized directory service. When a user joins an organization, appropriate values are entered for the person's attributes. For example, a user might have the following attribute values, which might be entered at the time the person joins an organization:

name=Sam Spinoza
location=Bldg 12
department=Engineering
manager=Seif Steiner.

If the appropriate groups are defined using dynamic group membership, the administrative tasks are completed just by entering this attribute information. For example, the user is automatically a member of the Engineering group (assuming the Engineering group is dynamically defined as every user whose department is Engineering.) If static groups are used, there are at least three additional administrative tasks that must be performed (specifically, adding the user to each separate location, department, and manager list.)

In the above example, there is a relatively small number of groups to be maintained (e.g. Marketing, Engineering, Sales, Accounting, Will Robinson's Staff, Seif Steiner's Staff, Judy Tomlin's Staff, Building 11 List, Building 12 List). In general, the number of groups that can be dynamically defined can be (minimally) a function of all distinguishable values of each attribute and combinations thereof. This number grows very quickly as an organization grows, which makes maintaining group membership information incredibly burdensome without dynamic group membership.

The following example serves to emphasize how dynamic groups are much more powerful than static groups. Consider defining a group of "New Employees" who should receive (for example) introductory orientation messages. Defining and maintaining a dynamic group of employees hired in the last 30 days would be simple (assuming the directory maintained an attribute such as createdTime indicating when the object was created in the directory):

currentTime−createdTime<30 days

Trying to maintain the membership of such a group using static group technology requires that an administrator both update the list every time someone enters the company and remove older members on a regular basis.

As the above example suggests, dynamic groups are not limited to just looking for exact value matches for individual attributes. A rich set of expressions and Boolean operations are available in directory search mechanisms to create many combinations. The expressions used in dynamic groups (as implemented in an LDAP-based directory service in the. presently preferred embodiment of the invention) are:

equal=An instance of the attribute exactly matches the value
contains* Used as a 'wild card' to allow presence check, or partial matches
sounds like~=Very useful for example in name searches
greater or equal>=For numerical comparisons
less or equal<=For numerical comparisons The '!' operator is used to negate any expression, e.g. !(location=New York) means the location can be anything other than 'New York'.

The '&' (and) and '|' (or) operators are used in combining expressions.

These operators can combine and modify the search expressions to give dynamic group specification even more expressive power. For example, if the directory service provides the following attributes:

PayGrade: (a numerical representation of a person's pay grade within the organization—From low of 1 to high of 10)
Location: (the plant in which the person works, e.g. London, England or New York, U.S.A)

If a user wanted to send mail to all people in the U.S.A. in the higher pay grades to notify them of stock blackout periods, a dynamic group could be created with a defining filter of:

(&(PayGrade>=8)(Location=*, U.S.A.)

Description of Information used in Defining a Dynamic Group

Dynamic groups use two paradigms in the creation of groups: filters and tree structure. The first paradigm can be thought of as set management. For example, take the following people in the directory:

| Person | Building | Department |
| --- | --- | --- |
| John | Building: 10 | Engineering |
| Jane | Building: 11 | Dept: Sales |
| Jim | Building: 10 | Dept: Sales |

A Dynamic Group filter can be thought of as creating sets of members in the directory, using their attributes. Using the above people, one can create two groups, i.e. 'People in Building 10' and 'People in the Sales department'

| People in building 10 | People in the Sales department |
|---|---|
| John (Building: 10 Dept: Engineering) | Jane (Building 11 Dept: Sales) |
| Jim (Building: 10 Dept: Sales) | Jim (Building: 10 Dept: Sales) |

One can create a number of sets based on a mixture of the attributes available for every individual.

Dynamic groups also use the tree structure that many directories are based on. These take a form such as below (common in X.500 and LDAP directories):

Dynamic Groups have the capability of taking names from only a part of the tree. In the preferred embodiment of the invention, two parameters are used to determine what portion of the directory tree to search, i.e. baseDN and Scope. These are both LDAP parameters for describing the directory.

baseDN is a node on the tree (e.g. ou=Engineering, o=Airius Corp.); and

Scope defines how many levels of the tree below the baseDN to use (base=only use that one node, one=use only all entries immediately underneath the baseDN node, or sub=use all entries under the baseDN node)

For example, using the tree above:

A dynamic group with a baseDN of organizational unit (ou)=Engineering, organization (o)=Airius Corp., and Scope=one would contain Bob James and George Palm. One with the same baseDN but Scope=sub would contain the above plus John Johns, Josh Franks, Jane Doe and Molly McGraw. And a group with a baseDN of person's common name (cn)=Ann Snider, ou=Marketing, o=Airius Corp. and Scope=base would only contain Ann Snider.

The two paradigms (and three parameters) above can be combined. For example, if John Johns is in Bldg. 5, Josh Franks is in Bldg 7, Jane Doe is in Bldg 6, Molly McGraw is in Bldg 7, Bob James is in Bldg 4, and George Palm is in Bldg 4:

Creating a dynamic group with a filter of Bldg=7, baseDN of ou=Engineering, o=Airius Corp, and Scope=sub using the tree paradigm produces a potential set of members containing: John Johns, Josh Franks, Jane Doe, Molly McGraw, Bob James, and George Palm.

Applying the filter criteria creates a group that contains Josh Franks and Molly McGraw.

A dynamic group is any set of users in which membership is dynamically determined. This contrasts with static group membership, in which a user entry includes an attribute which explicitly lists group members.

In one embodiment of the invention, a dynamic definition of group membership is an LDAP URL, e.g.:

ldap:///ou=marketing,o=acmecorp,c=US??sub?(mail=*)

Mail sent to a group with this mgrpDeliverTo attribute sends the message to all people (with mail addresses) that are in the marketing tree of Acme Corp.

For more information regarding LDAP, see Lightweight Directory Access Protocol, RFC-1777; A String Representation of LDAP Search Filters, RFC-1558; The String Representation of Standard Attribute Syntaxes, RFC-1778; A String Representation of Distinguished Names; RFC-1798 Connectionless LDAP, RFC-1779; The LDAP Application Program Interface, RFC-1823; and An LDAP URL Format, RFC-1959.

In the presently preferred embodiment of the invention, the ldap URL structure is:

ldap://server:port/baseDN?attribs?range?filter

In which:
   server:port—are the server/port of the directory from which to get the entries.
   baseDN—This is the base DN in the directory from which searching is performed.
   attribs—This is a list of attributes to retrieve from the entry. This parameter of the URL is not used in dynamic groups.
   range—describes how many levels in the tree below the baseDN to search (BASE/ONE/SUB).
   filter—This filters out which entries from the tree are desired (e.g. in the example above, only those entries having mail addresses).

Applications supporting any kind of group typically are interested in performing two functions involving the group:

Enumerate the members of the group. For example, a mail delivery agent might do this when delivering a piece of mail to the group, which involves placing a copy of the mail in each group member's electronic mail box. Additional information (e.g. mail box location) may be needed for each member.
   Verify membership in the group. For example, a web server answering a query for a web page accessible only to members of a given group, might do this to ensure that the client requesting access was indeed a member of the group in question.

The following discussion examines how each of these functions works for both static and dynamic groups. This discussion is followed by a description of an instantiation of the invention as embodied in two products from Netscape Communications Corporation, i.e. Directory Server version 1.0 and Messaging Server version 3.0.

Membership Enumeration

Figure 1:
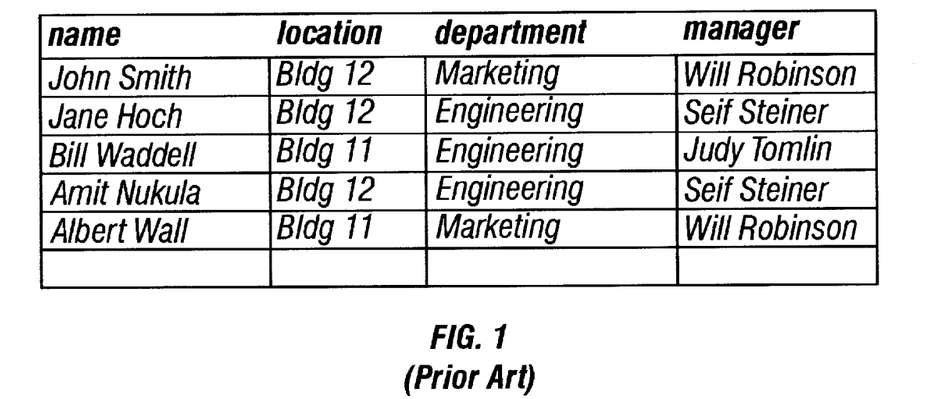
FIG. 1 is an illustration showing a view of a directory (partial contents)
Figure 2:
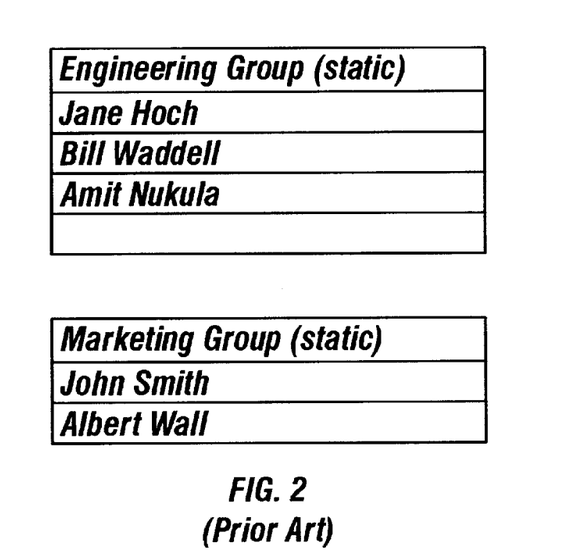
FIG. 2 is an illustration showing a view of static groups (Engineering and Marketing Groups)

FIG. 1 is an illustration showing a view of a directory (partial contents). For static groups, the membership enumeration function is performed by reading the group and stepping through the attribute values returned comprising the membership list. If information on each member is desired, a separate read of each member requesting the desired information is performed. FIG. 2 is an illustration showing a view of static groups (Engineering and Marketing Groups).

The directory operations required are summarized below.
   One search returning one group entry containing membership list.
   N searches, each returning information for each member.

Figure 3:
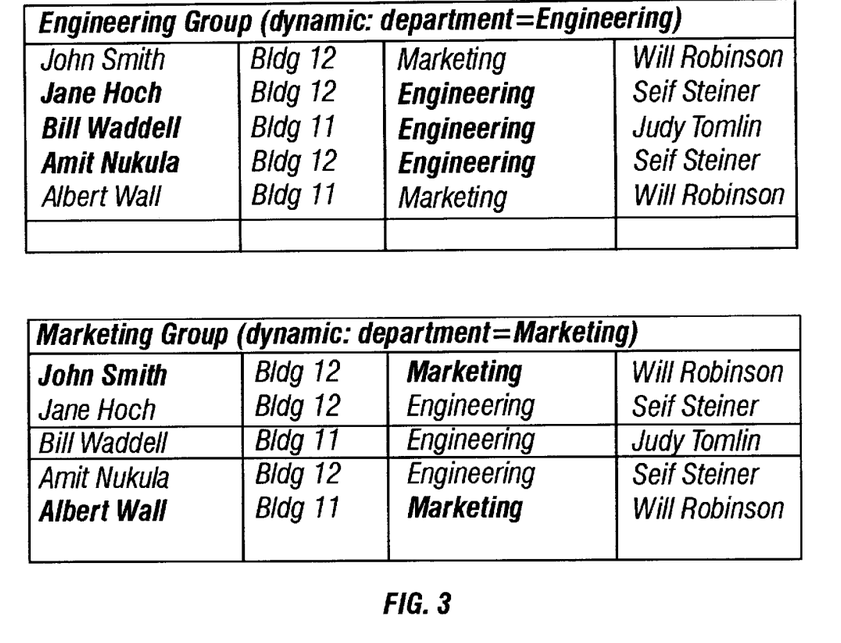
FIG. 3 is an illustration showing a view of dynamic groups (Engineering and Marketing Groups) according to the invention.

FIG. 3 is an illustration showing a view of dynamic groups (Engineering and Marketing Groups) according to the invention. For dynamic groups, the membership enumeration function is performed by reading the group and retrieving the membership criteria. A subsequent search based on the membership criteria is initiated. Stepping through the results of this search produces the membership list, along with any desired information for each member. The directory operations required are summarized below.

One search returning one group entry containing membership criteria.

One search returning N member entries containing desired information.

As can be seen, the order of work is similar in both cases, and is linear in the number of group members.

Membership Enumeration Efficiency

There are a number of factors one could use to evaluate the efficiency and performance of a group membership enumeration. In the context of a network-accessible directory, the factor that typically contributes the most to overall performance is the network cost of performing the evaluation. Network cost can be broken into several components, including:

Amount of data that must be transferred

Number of network round trips required

Cost of each round trip

Because the cost of each round trip is the same in both comparisons, it is assumed that each such transaction comprises one constant unit. Accordingly, this cost is ignored in the following analysis.

As used herein, the term "enumeration," for example where required by a mail server delivering a piece of electronic mail to the members of a group, is defined as retrieving some piece of information on each group member (e.g. an email address). This operation is used herein to compare static versus dynamic group efficiency.

Static Group Network Cost

Figure 4:
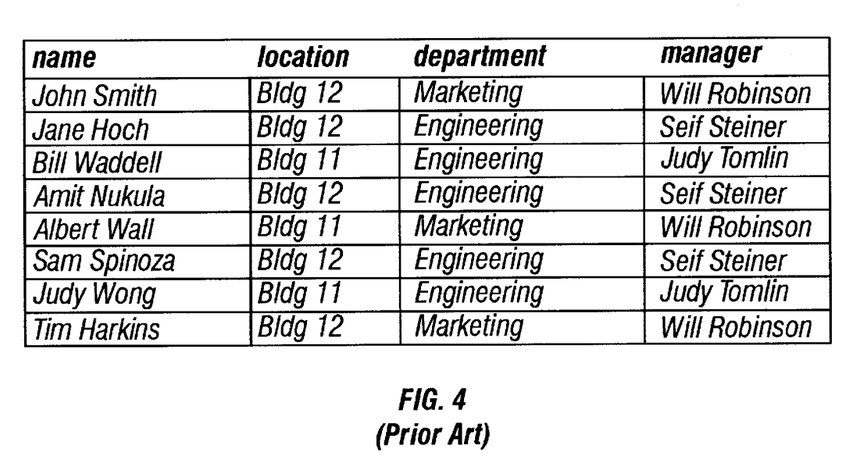
FIG. 4 is an illustration showing a view of a directory after updates.
Figure 5:
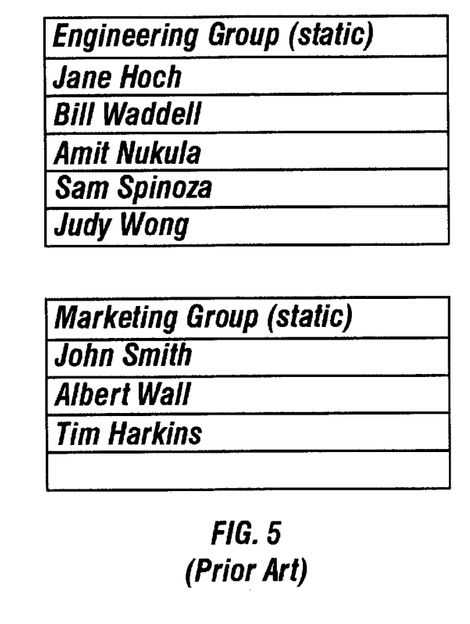
FIG. 5 is an illustration showing a view of static groups (each group updated, three updates in this example)

FIG. 4 is an illustration showing a view of a directory after updates. FIG. 5 is an illustration showing a view of static groups (each group updated, three updates in this example). Using the above stated definition of enumeration, the interaction for a static group with N members is as follows.

Client reads the static group, including its membership list, from the directory. This requires one network round trip and order N data to be transferred.

For each group member, client reads the member's entry, requesting the desired piece of information. This requires N network round trips (one for each member), and order N data to be transferred.

Therefore, the total number of network round trips is N+1 (order N). The total amount of data transferred is order N.

Dynamic Group Network Cost

Figure 6:
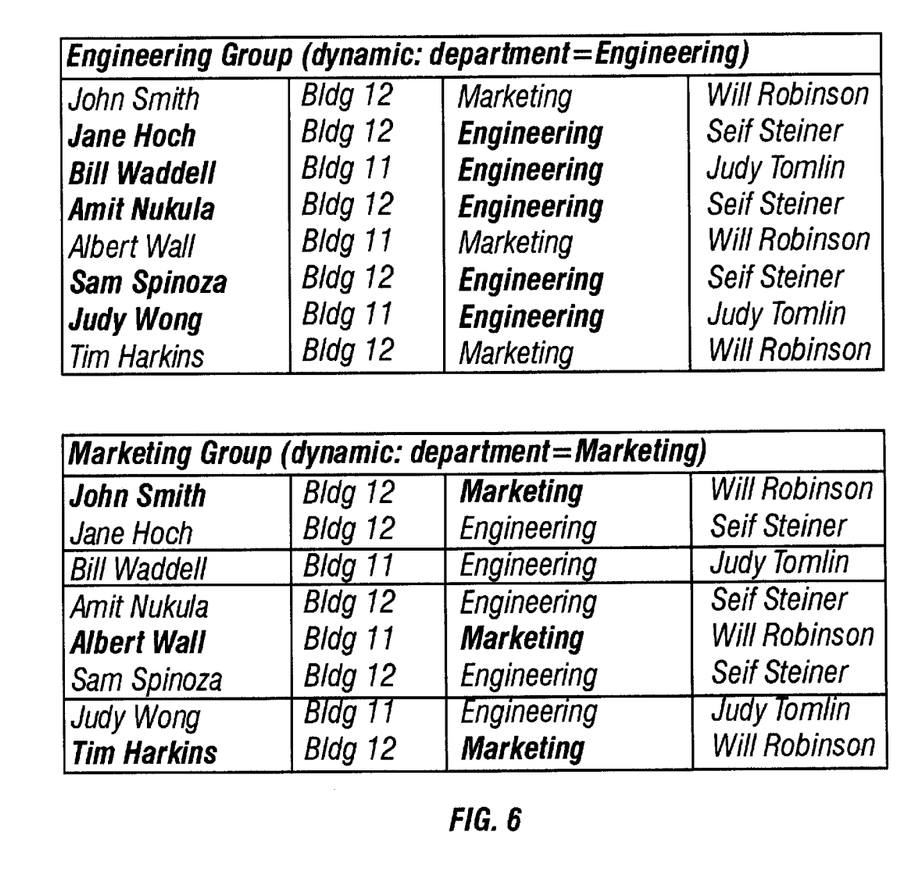
FIG. 6 is an illustration showing a view of dynamic groups (no updates required) according to the invention.

FIG. 6 is an illustration showing a view of dynamic groups (no updates required) according to the invention. Using the definition of enumeration set forth herein, the interaction for a dynamic group with N members is as follows.

Client reads the dynamic group entry, including the membership criteria, from the directory. This requires one network round trip and a constant (order 1) amount of data to be transferred.

Client searches the directory using the membership criteria, requesting the desired information for each entry returned. This requires one network round trip, and order N data to be transferred.

Therefore, the total number of network round trips is one (constant). The total amount of data transferred is still order N.

Clearly, the dynamic group invention described herein is more efficient in number of network round trips, and no less efficient in the amount of data transferred.

Membership Evaluation

For static groups, the membership evaluation function is performed in one of three ways:

Method 1: The group and its membership list are read, and the membership list is consulted locally to determine whether the given entry is a member of the group.

Method 2: The group is searched, with a filter testing for the presence of the purported member. A successful return indicates membership, an unsuccessful return indicates non-membership.

Method 3: The directory is searched with a filter selecting all groups of which the purported member is a member. The resulting list of entries is consulted by the client to see if the group in question is listed, in which case membership is confirmed. Otherwise, membership is denied.

The directory operations required are summarized below.

Method 1: One base search to read the group, member list is looked through locally.

Method 2: One base search of the group entry, member list is looked through by the server.

Method 3: One search of the directory, resulting entries are looked through by the client.

For dynamic groups, the membership evaluation function is performed in the following way:

The purported member's entry is examined to determine if it is within the scope of the group's membership criteria. Then, the purported member's entry is searched with a filter corresponding to the group's membership criteria. A successful return indicates membership, an unsuccessful return indicates no membership.

The directory operations required are summarized below:

One base search to retrieve membership criteria.

One base search to determine if purported member fulfills criteria.

Membership Evaluation Efficiency

Membership evaluation as defined herein is the process of determining whether a given member M belongs to a given group G. In evaluating the efficiency of this operation, the network factors of round trips and data transferred are examined.

Assume a group with N members, and that the user in question is a member of T groups in total.

Static Group Network Cost

Previously, three methods of evaluating static group membership were described. Each method's cost is detailed below:

Method 1

Retrieve the group, including membership list, and search through the members to see if M is present.

The total number of network round trips is constant. The total amount of data transferred is order N, with the size of the group.

Method 2

Search the group with a filter testing for the presence of member M.

The total number of network round trips is constant. The total amount of data transferred is constant.

Method 3

Search the entire directory with a filter testing for the presence of member M, retrieving each group that matches.

Look through the resulting list of groups to see if G is present.

The total number of network round trips is constant. The total amount of data transferred is order T, where T is the number of groups to which M belongs.

Dynamic Group

With a dynamic group, the following method is used to test for membership in the group.

Read the group to retrieve the membership criteria.

Use the membership criteria in a search of the purported member M to test for membership.

The total number of network round trips is two. The total amount of data transferred is constant.

Comparing to static groups, the number of network round trips is the same (both constant). The total amount of data transferred is constant only for one static method.

Instantiation of Invention in Preferred Embodiment

Figure 7A:
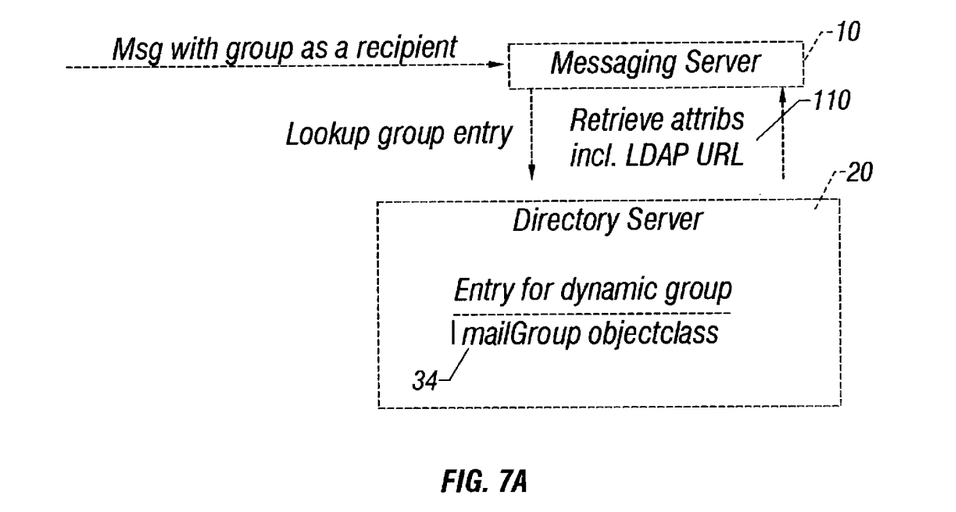
FIGS. 7a and 7b provide block schematic diagrams that show a presently preferred implementation of the invention.
Figure 7B:
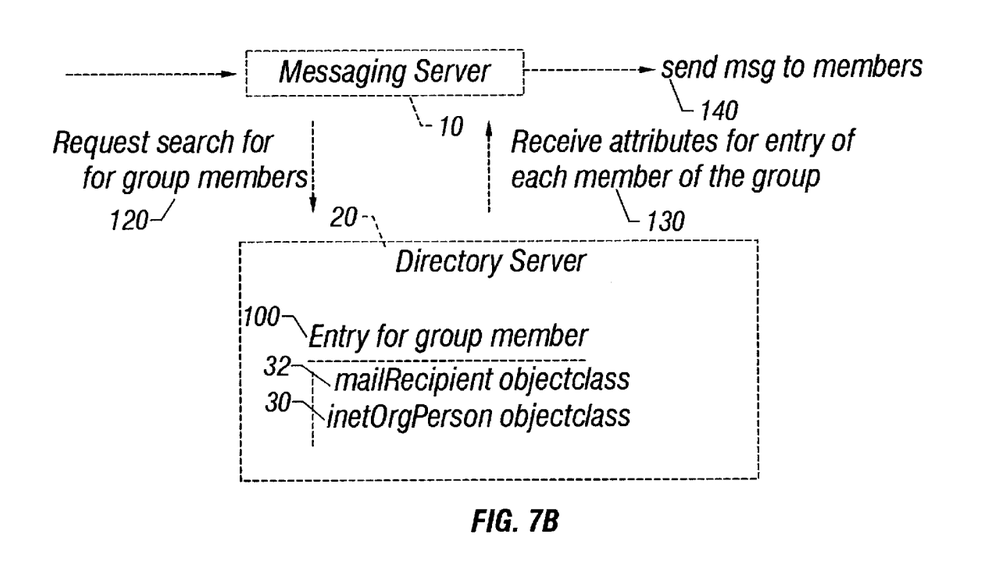

FIGS. 7a and 7b provide block schematic diagrams that show a presently preferred implementation of the invention, in which the use of dynamic groups in Netscape Messaging Server version 3.0 and Netscape Directory Server 1.0 to route mail to groups of users is described. The invention is used in other ways in Netscape products; but this description details an initial use of the invention and illustrates the invention's mechanics. It will be appreciated by those skilled in the art that the invention may be implemented in other ways and applied to other environments.

The Messaging Server 10 uses the Directory Server 20 to maintain information about the users for whom it delivers and stores electronic mail. Each user is represented as an inetOrgPerson object 30 (see Table "A" below for the structure of inetOrgPerson.) For a user to receive mail on a Netscape Messaging Server, a class of attributes known as a mailRecipient object 32 is combined (or "mixed-in") with the inetOrgPerson object (100) (see Table "B" for the structure of the mailRecipient object.) The mailRecipient attributes contain essential information which identifies the name of the Messaging Server that stores the user's mail (i.e. the mailMessageStore attribute), the user identifier used by the user to login to the Messaging server (the uid attribute), along with electronic mail addresses that identify the specific user (i.e. the mail and mailAlternateAddress attributes.)

In addition to maintaining individual user information, the Messaging Server maintains information about groups in the Directory Server using the mailGroup object 34 (see Table "C" for the structure of the mailGroup object.) When the Messaging Server determines that it needs to deliver a message to a group, it retrieves the group's mailGroup attributes (110). The Messaging Server handles static members first, by sending the message to each address listed as a mgrpRFC822MailMember attribute (there can be more than one instance of this attribute in a mailGroup object.)

In addition, the Messaging Server implements dynamic groups. Specifically, the mgrpDeliverTo attribute can contain a search specification, referred to herein as an LDAP URL (Lightweight Directory Access Protocol Uniform Resource Locator), which the Message Server sends to the Directory Server (120). This search specification causes the Directory Server to return a set of users or group objects (130). The Message Server then causes the message to be sent to each of the users or groups returned by this search (140).

As described above, the LDAP URL takes the form:

ldap://[server:port]/[baseDN]?[attrs]?[level]?[filter].

The Messaging Server connects with the Directory Server to perform the dynamic search. The mailRecipient attributes are then read from the entries found by the search, enabling mail to be sent to those recipients.

Also, it is allowed for members of a dynamic group to be other groups (even other dynamic groups). In that case, those groups in turn are expanded, and their members also receive the email.

TABLE A

Attributes of an LDAP-based inetOrgPerson Object

| Attributes | Attribute Description |
|---|---|
| Common Name | (Required) Defines the person's common name. |
| Surname | (Required) Defines the person's surname, or last name. |
| BusinessCategory | Identifies the business in which the person is involved. |
| CarLicense | Identifies the person's car license plate number. |
| DepartmentNumber | Identifies the department for which the person works. |
| Description | Provides a text description of the person. |
| EmployeeNumber | Identifies the person's employee number. |
| EmployeeType | Identifies the person's type of employment (for example, full time). |
| FacsimileTelephoneNumber | Identifies the person's fax number. |
| GivenName | Identifies the person's given, or first, name. |
| HomePhone | Identifies the person's home phone number. |
| HomePostalAddress | Identifies the person's home mailing address. |
| Initials | Identifies the person's initials. |
| JpegPhoto | Contains an image in jpeg format. |
| Location | Identifies the location in which the person resides. |
| LabeledURI | Specifies a universal resource locator that is relevant to the person. |
| Mail | Identifies the person's electronic mailing address. |
| Manager | Distinguished name representing the person's manager. |
| Mobile | Identifies the person's mobile phone number. |
| Organizational Unit | Identifies the organizational unit to which the person belongs. |
| Pager | Identifies the person's pager number. |
| PhysicalDeliveryOfficeName | Identifies a location where physical deliveries can be made. |
| PostalAddress | Identifies the person's business mailing address. |
| PostalCode | Identities the person's business postal code(such as a United States zip code). |
| PostOfficeBox | Identifies the person's business post office box. |
| PreferredDeliveryMethod | Identifies the person's preferred method of contact or delivery. |
| RoomNumber | Identifies the room number in which the person is located. |
| Secretary | Identifies the person's secretary or administrator. |
| SeeAlso | URL to information relevant to the person. |
| State | Identities the state or province in which the person resides. |
| StreetAddress | Identifies a street address at which the person is located. |
| Acess Control Information | Identifies access control information for the person's entry. |
| TelephoneNumber | Identifies the person's telephone number. |
| Title | Identifies the person's title. |
| UserID | Identifies the person's user ID. |
| UserPassword | Identifies the password with which the person can bind to the directory. |
| x500UniqueIdentifier | Undefined. |

TABLE B

Attributes of an LDAP-based mailRecipient Object

| Attributes | Attribute Description |
| --- | --- |
| Common Name | (Required) Defines the person's common name. |
| Mail | Identifies the person's electronic mailing address. |
| MailAccessDomain | Identifies the domain from which the mail user can login to obtain mail. |
| MailAlternateAddress | Identifies an alternate mail address for address is acceptable. |
| MailAutoReplyMode | Identifies the auto reply mode set for the mail user. |
| MailAutoReplyText | Contains the text sent when autoreplying to mail sent to the user. |
| MailDeliveryOption | Identifies the mail delivery mechanism to be used for the mail user. |
| MailForwardingAddress | Identifies a mail address to which the user's mail is to be forwarded. |
| MailHost | Identifies the host on which the user's mail account resides. |
| MailMessageStore | Identifies the path to the directory containing the user's mail box. |
| MailProgramDeliveryInfo | Identifies commands used for programmed mail delivery. |
| MailQuota | Maximum disk space allowed for the user's mail box. |
| MultiLineDescription | Contains descriptive text regarding the mail user. |
| UserID | Identifies the mail user's user ID. |
| UserPassword | Identifies the password with which the mail user can bind to the directory. |

TABLE C

Attributes of an LDAP-based mailGroup Object

| Attributes | Attribute Description |
| --- | --- |
| Mail | (Required) Identifies the list's electronic mailing address. |
| Common Name | Defines the list's common name. |
| MailAlternateAddress | Identifies an alternate mail address for the user. |
| MailHost | Identifies the host on which the user's mail account resides. |
| MgrpAllowedBroadcaster | URL identifying a mail user that is allowed to send mail to the mail group. |
| MgrpAllowedDomain | Domain from which users can send mail to the mail group. |
| MgrpDeliverTo | Dynamic group membership method of identifying members of the mail group. |
| MgrpErrorsTo | Mailing address to which mail delivery error messages are sent. |
| MgrpModerator | Mailing address to which rejected mail messages are sent. |
| MgrpMsgMaxSize | Maximum message size that can be sent to the mail group. |
| MgrpMsgRejectAction | Specifies the action to be taken in the event that mail sent to the mail group is ejected |
| MgrpMsgRejectText | Contains the text to be sent in the event that mail sent to the mail group is rejected. Identifies a recipient of mail that is sent to the |
| mgrpRFC822Mail | Member mail group, but who is not in actuality a member of the mail group. |
| Owner | Distinguished name that identifies the mail group's owner. |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for use in connection with application and network services to provide a directory service that defines dynamic groups of directory members, the method comprising the steps of:

defining a directory search specification for a dynamic group based upon user attribute information, where said dynamic group is any set of users in which membership is dynamically determined and in which groups of users are defined by said directory search specification;

evaluating said directory search specification at a service delivery time;

determining whether information maintained in a directory matches said directory search specification;

delivering said service to said dynamic group;

providing a directory server to maintain information about users; and providing a messaging server that maintains information about groups in said directory server;

wherein when said messaging server sends a search specification to said directory server which causes said directory server to return a set of users or group objects; and wherein said message server then causes said message to be sent to each of the users or groups returned by said search.

2. The method of claim 1, further comprising the step of:

providing a set of expressions and Boolean operations for use in a directory search.

3. The method of claim 2, wherein said expressions comprise any of:

equal=where an instance of the attribute exactly matches the value;

contains*which is used as a wild card to allow presence check, or partial matches;

sounds like~=which is used in name searches;

greater or equal>=which is used for numerical comparisons;

less or equal<=which is used for numerical comparisons;

an '!' operator which is used to negate any expression; and

'&' (and) and '|' (or) operators which are used in combining expressions.

4. The method of claim 1, wherein said dynamic groups may use any of a dynamic group filter and a tree structure in the creation of groups.

5. The method of claim 4, wherein said dynamic group filter provides set management by creating sets of members in said directory using said members attributes.

6. The method of claim 4, wherein said tree structure comprises parameters that are used to determine what portion of said directory tree to search.

7. The method of claim 1, further comprising the step of:

enumerating members of said dynamic group retrieving some piece of information on each group member.

8. The method of claim 7, wherein said group membership enumeration step further comprises the steps of:

reading said group;

retrieving membership criteria;

initiating a subsequent search based on said membership criteria is initiated; and stepping through the results of said subsequent search to produce a membership list, along with any desired information for each member.

9. The method of claim 1, further comprising the step of:

verifying membership in said dynamic group.

10. The method of claim 9, wherein said verifying step further comprises the step of:

answering a query for a web page accessible only to members of a given group to ensure that a client requesting access is a member of said dynamic group in question.

11. The method of claim 1, further comprising the steps of:

examining a purported group member's entry to determine if it is within the scope of said group's membership criteria; and searching said purported member's entry with a filter corresponding to said group's membership criteria;

wherein a successful return indicates group membership and an unsuccessful return indicates no group membership.

12. The method of claim 1, wherein each user is represented as an inetOrgPerson object; and wherein a class of attributes mailRecipient object is combined with said inetOrgPerson object for a user to receive mail.

13. The method of claim 12, wherein said mailRecipient attributes define information which identifies any of the name of a messaging server that stores a user's mail, a user identifier used by said user to login to a messaging server; and electronic mail addresses that identify a specific user.

14. The method of claim 1, wherein a dynamic group may contain other groups.

15. An apparatus for use in connection with application and network services to provide a directory service that defines dynamic groups of directory members, comprising:

a directory search specification for a dynamic group based upon user attribute information, where said dynamic group is any set of users in which membership is dynamically determined and in which groups of users are defined by said directory search specification;

means for evaluating said directory search specification at a service delivery time;

means for determining whether information maintained in a directory matches said directory search specification;

means for delivering said service to said dynamic group;

a directory server to maintain information about users; and a messaging server that maintains information about groups in said directory server;

wherein when said messaging server sends a search specification to said directory server which causes said directory server to return a set of users or group objects; and wherein said message server then causes said message to be sent to each of the users or groups returned by said search.

16. The apparatus of claim 15, further comprising:

a set of expressions and Boolean operations for use in a directory search.

17. The apparatus of claim 16, wherein said expressions comprise any of:

equal=where an instance of the attribute exactly matches the value;

contains*which is used as a wild card to allow presence check, or partial matches;

sounds like ~=which is used in name searches;

greater or equal>=which is used for numerical comparisons;

less or equal<=which is used for numerical comparisons;

an '!' operator which is used to negate any expression; and

'&' (and) and '|' (or) operators which are used in combining expressions.

18. The apparatus of claim 15, wherein said dynamic groups may use any of a dynamic group filter and a tree structure in the creation of groups.

19. The apparatus of claim 18, wherein said dynamic group filter provides set management by creating sets of members in said directory using said members attributes.

20. The apparatus of claim 18, wherein said tree structure comprises parameters that are used to determine what portion of said directory tree to search.

21. The apparatus of claim 15, wherein members of said dynamic group retrieving some piece of information on each group member are enumerated.

22. The apparatus of claim 15, wherein membership in said dynamic group is verified.

23. The apparatus of claim 15, wherein each user is represented as an inetOrgPerson object; and wherein a class of attributes mailRecipient object is combined with said inetOrgPerson object for a user to receive mail.

24. The apparatus of claim 23, wherein said mailRecipient attributes define information which identifies any of the name of a messaging server that stores a user's mail, a user identifier used by said user to login to a messaging server; and electronic mail addresses that identify a specific user.

25. The apparatus of claim 15, wherein a dynamic group may contain other groups.

* * * * *